United States Patent [19]

Johnson et al.

[11] 3,957,602

[45] May 18, 1976

[54] RECOVERY OF COPPER FROM CHALCOPYRITE UTILIZING COPPER SULFATE LEACH

[75] Inventors: Robert K. Johnson, Denver; Enzo L. Coltrinari, Arvada, both of Colo.

[73] Assignee: Cyprus Metallurgical Processes Corporation, Los Angeles, Calif.

[22] Filed: July 24, 1974

[21] Appl. No.: 491,275

[52] U.S. Cl. ................................ 204/106; 204/107; 204/108; 423/27; 423/36; 423/37; 423/32; 423/46; 75/101 R; 75/115; 75/117; 75/121
[51] Int. Cl.² ...................... C22B 3/00; C22B 15/08
[58] Field of Search ................... 204/108, 106, 107; 75/117, 115, 101 R, 121; 423/36, 37, 27, 32, 46

[56] References Cited
UNITED STATES PATENTS

| | | | |
|---|---|---|---|
| 3,798,304 | 3/1974 | Weston | 75/117 X |
| 3,816,105 | 6/1974 | McKay et al. | 75/117 X |
| 3,891,522 | 1/1974 | McKay et al. | 75/117 X |

*Primary Examiner*—G. Ozaki
*Attorney, Agent, or Firm*—Sheridan, Ross & Fields

[57] ABSTRACT

Copper is recovered from chalcopyrite by means of a pollution-free hydrometallurgical process which entails leaching and converting the chalcopyrite with copper sulfate in order to produce an insoluble copper sulfide, a soluble iron sulfate and sulfuric acid. A secondary leach is then conducted in order to react the copper sulfide with oxygen in the presence of a jarosite-forming cation to produce a soluble copper sulfate and an insoluble iron bearing jarosite. This copper sulfate is separated from the jarosite and sent to a copper recovery process and/or recycled. Alternatively, the copper sulfide from the initial leach may be separated from the iron sulfate solution immediately after the initial leach, and this copper sulfide can be treated with other processes to produce elemental copper and sulfur.

25 Claims, No Drawings

RECOVERY OF COPPER FROM CHALCOPYRITE UTILIZING COPPER SULFATE LEACH

BACKGROUND OF THE INVENTION

1. Field of the Invention

This invention relates to the hydrometallurgical recovery of copper from chalcopyrite by means of a copper sulfate leaching process.

2. The Prior Art

Processes have long been disclosed describing the recovery of copper from its sulfide and mixed sulfide forms. Most of the economic copper recovery processes are classified as pyrometallurgical, with the ore being smelted to oxidize the sulfide to sulfur dioxide. This sulfur dioxide is now of course recognized as a major air pollutant, and means must be used in conjunction with pyrometallurgical plants to eliminate this contaminant. As a result considerable development is now being undertaken to formulate hydrometallurgical processes in order to circumvent the production of the byproduct sulfur dioxide. Much of the hydrometallurgical development centers around chloride and ammoniacal leaching processes, some of which may prove to ultimately be beneficial.

Copper sulfate leaching agents have been proposed to be used in conjunction with a number of metal sulfides, including zinc sulfide. U.S. Pat. No. 3,655,538 to Renken discloses such a process whereby the zinc sulfide is leached with copper sulfate in order to produce copper sulfide and a zinc sulfate solution, the zinc sulfate solution being easily separated for the ultimate recovery of zinc. Another similar process discloses the utilization of a copper sulfate leach to recover nickel from a nickel-copper matte, this process being set forth by Llanos et al in a paper presented at the Third Annual Meeting of the Hydrometallurgical Section of the Metallurgical Society of C.I.N., Edmonton, Oct. 19, 1973.

Heretofore the value of leaching chalcopyrite with copper sulfate has not been recognized, and it has commonly been believed that chalcopyrite does not react with copper sulfate. This is borne out by the Renken patent, cited above, which specifically sets forth at column 3 that chalcopyrite does not react with copper sulfate.

It has now been recognized that under the proper processing conditions, as hereinafter set forth, copper sulfate can be used as a beneficial leaching agent for chalcopyrite, and such a process results in a number of advantages including providing an effective means for separating copper sulfide from many other metal sulfides and other impurities, as well as greatly facilitating any secondary leaching of the copper sulfides.

SUMMARY OF THE INVENTION

A pollution-free hydrometallurgical copper recovery process results from the leaching of chalcopyrite with copper sulfate in order to form insoluble copper sulfides, a soluble iron sulfate solution and sulfuric acid. The copper sulfides can then be separated from the product mixture and further treated in order to recover the copper values. Also, the products from the initial leach may be immediately subjected to a secondary oxidation leach reaction wherein the copper sulfides are converted to a soluble copper sulfate solution and the iron is converted to an insoluble state such that the copper sulfate solution is easily separated from the residual insoluble iron constituents along with any other insoluble impurities. The copper may then be conventionally recovered from the isolated copper sulfate solution, and if desired a portion of the copper sulfate solution may be recycled for reaction and conversion with fresh chalcopyrite feed.

DESCRIPTION OF THE PREFERRED EMBODIMENTS

The basic chemical reaction with which this process is concerned is as follows:

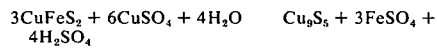

$$3CuFeS_2 + 6CuSO_4 + 4H_2O \rightarrow Cu_9S_5 + 3FeSO_4 + 4H_2SO_4$$

Along with the digenite ($Cu_9S_5$) some chalcocite ($Cu_2S$) and covellite (CuS) in minor amounts may also be produced.

In addition to chalcopyrite the starting materials may contain other copper sulfides, such as chalcocite and covellite, and also may contain sulfides of other metals. For example, copper may be recovered from mixed sulfides containing chalcopyrite and zinc sulfide according to the above set forth reaction since the zinc will go into solution as zinc sulfate, permitting the insoluble digenite to be easily separated from the solution containing zinc sulfate, iron sulfate and sulfuric acid. Examples of other metal sulfides which would similarly react in the presence of chalcopyrite include nickel and cobalt.

This initial leach reaction may be operated in accordance with conventional leaching techniques, with a reaction temperature preferably maintained at greater than about 100°C, more preferably from about 150° to about 250°C, and most preferably from about 180° to about 200°C. As is common in leaching operations the raw feed material is crushed and ground to a sufficiently small particle size in order to conveniently perform concentration operations such as flotation. When leaching mixed sulfides containing chalcopyrite the copper sulfate concentration is preferably maintained from about 1 gram per liter of copper to saturation concentration, more preferably from about 30 to about 100, and most preferably from about 40 to about 80 grams per liter. When processing chalcopyrite alone, this concentration preferably approaches the copper sulfate saturation concentration. The mole ratio of copper sulfate to chalcopyrite is as shown in the above set forth reaction, i.e., two moles of copper sulfate per mole of chalcopyrite. This is of course the stoichiometric amount required, and an excess amount of copper sulfate may be maintained.

The reaction time is inversely proportional to temperature, the amount of time decreasing with increased temperatures.

As is conventional in chemical leaching, this initial leach reaction may be performed in more than one stage in order to expeditiously carry out the reaction, and may be conducted cocurrently or countercurrently.

Following the initial leach reaction the copper sulfide product may be immediately separated from the soluble sulfates and sulfuric acid. Such a separation is accomplished by conventional means in the art, as for example by thickening and filtration. A separation at this stage of the process may be preferred in some instances, however, a further separation will be necessitated at a later stage of the process since the gangue material will also be separated with the copper sulfides. Separation immediately following the initial leach reaction is therefore dictated by the particular copper sulfide reaction employed to recover the elemental copper values and also the composition of the initial feed material.

One preferable technique is therefore to subject the products of the initial leach and conversion reaction directly to a secondary leach reaction in conjunction with a jarosite forming cation to convert the copper sulfides to a copper sulfate solution while precipitating the iron sulfate as jarosite. Due to the nature of this reaction it is apparent that this secondary leach will immediately follow the initial leach in those cases when the sulfides initially fed to the reaction are basically copper or iron sulfides with only relatively small proportions of other metal sulfides. If the products of the initial leach include substantial amounts of metal sulfates other than iron sulfates, it will then be preferable to separate the copper sulfides prior to the initiation of this secondary leach.

A preferable secondary leach reaction is an oxygen leach in an acid media in the presence of a jarosite forming cation. As mentioned the products of this leach reaction are copper sulfate and jarosite. This oxygen leach is operated in accordance with known techniques, as for example set forth in U.S. Pat. No. 3,642,435. Partial oxygen pressures for such a reaction are well below the comparable necessary values required in the absence of the initial copper sulfate leach.

In performing the secondary oxygen leach in the presence of iron sulfates it is preferred to add a sufficient amount of a jarosite-forming cation in order that the iron may be precipitated from the solution. These jarosite-forming cations are discussed in U.S. Pat. No. 3,684,490 and are preferably potassium, sodium and ammonium. The amount added need only be sufficient to precipitate the iron from solution.

Other secondary techniques may also be employed to recover the copper values from the copper sulfide products of the primary leach reaction. For example, chloride leaching techniques as described in U.S. Pat. No. 3,767,543 may be utilized. Preferable chloride leaching agents include ferric chloride and cupric chloride. Also the copper sulfides may be modified by techniques known in the art in order to employ electrolytic dissolution processes, as set forth for example in U.S. Pat. Nos. 3,673,061 and 3,736,238. Other suitable secondary leach operations include ammoniacal leaching and cyanide leaching. It is therefore understood that while the following discussion assumes the utilization of a secondary oxygen leach in an acid media, the artisan can determine from the present state of the art the necessary modifications to be made should one of these alternative processes be employed.

Following the secondary oxidation leach it is necessary to separate the copper sulfate from the remaining solids, including the jarosite and the gangue material. This separation is conveniently made by thickening and filtration or other means known in the art.

Once the copper sulfate is isolated the copper may be recovered. This recovery is conveniently made by means known in the art, preferably by electrolysis or cementation. A portion of the copper sulfate can also be recycled in order to treat new chalcopyrite feed material. The amount of copper sulfate recycled is dependent upon the fresh sulfide feed characteristics.

The following examples are illustrative of some of the aspects encompassed by this process.

EXAMPLE NO. 1

A commercial copper concentrate assaying 34.5% copper, 22.9% iron, 32% total sulfur, 4.9% silica, 1.7 ounces per ton silver, 0.01 ounces per ton gold, 0.12% calcium, 0.27% molybdenum, 0.01% lead and 0.02% nickel and being comprised of the approximate mineral percentages of 40% chalcopyrite, 23% chalcocite, 23% pyrite, 3% covellite, 1% bornite, less than 1% hematite and 9% gangue was ground to a mesh size of $-270$ and reacted with copper sulfate in a ratio of 0.84 pounds of copper as copper sulfate per pound of copper initially in the concentrate. The temperature was maintained at 180°C and the reaction was permitted to take place under normal agitation for 3 hours. The initial pulp density was 192 grams of solids per liter of solution and the copper sulfate concentration was 55 grams per liter of copper. The product analysis indicated that 0.74 pounds of copper was precipitated, mostly as digenite, per pound of copper initially in the concentrate, representing a substantial conversion of chalcopyrite copper to digenite copper. Iron sulfate and sulfuric acid were also produced.

EXAMPLE NO. 2

The process of Example No. 1 was followed in all respects except that the reaction temperature was maintained at 210°C and the total time of the reaction was 1 hour. The results showed 0.8 pounds of copper precipitated as digenite per pound of copper in the initial concentrate.

EXAMPLE NO. 3

Two identical acid pressure leaches were performed on copper concentrates of identical composition as that set forth in Example 1, one pressure leach being performed directly on the concentrates while the other pressure leach was performed subsequent to a copper sulfate leach reaction. The concentrate was ground to $-325$ mesh and a pulp density of 4.7% solids was formed. The leached solution contained 13 grams per liter of copper, 33 grams per liter of sulfuric acid, and 11 grams per liter of sodium sulfate. In both cases the reaction temperature was maintained at 95°C, the vapor and oxygen total pressure at 125 psig and the solution was agitated at a turbine tip speed of 525 feet per minute. After an elapsed time of 3 ½ hours, the results showed 82% of the copper was extracted from the sample that was not treated with copper sulfate, while 4 grams per liter of iron remained in solution. On the other hand, the sample that was initially treated with the copper sulfate leach reaction yielded a 95% copper extraction, with only 1.3 grams of iron in each liter of solution, the remaining iron being precipitated as sodium jarosite.

EXAMPLE NO. 4

Another comparative test similar to Example No. 3 was performed with two samples of a commercial concentrate of identical composition as that set forth in Example No. 1. One sample was directly leached under ammoniacal conditions while the other sample was initially leached with copper sulfate followed by the ammoniacal leach reaction. The leach solution had a concentration of 80 grams per liter of ammonium sulfate and 75 grams per liter of ammonia as ammonium hydroxide. The temperature was maintained at 81°C for both tests, and the oxygen and ammonia total pressure was kept at 20 psig. After an elapsed time of 2 hours, the sample which had not been treated with the copper sulfate solution showed a 93% copper recovery, while the sample which had initially been treated showed a 98% copper extraction. In both Examples 3 and 4 the copper sulfate leach reaction was performed in similar fashion to that described in Example 1.

EXAMPLE NO. 5

A commercial copper concentrate consisting of about 75% chalcopyrite and assaying 26.1% copper, 27.5% iron and 31.4% total sulfur was reacted with 2.2 moles of copper as copper sulfate per mole of copper in the chalcopyrite concentrate at 180°C for 3 hours. The product analysis indicated that two moles of copper as copper sulfate reacted with one mole of copper in the chalcopyrite concentrate to yield three moles of copper in the form of digenite, (⅓ of a mole of digenite) this analysis being verified by X-ray diffraction. Essentially all of the iron from the chalcopyrite entered into solution as ferrous sulfate.

What is claimed is:

1. A process for hydrometallurgically recovering elemental copper from chalcopyrite comprising:
   reacting the chalcopyrite with a copper sulfate solution at a temperature and mole ratio sufficient to form an insoluble copper sulfide consisting essentially of digenite, a soluble iron sulfate and sulfuric acid;
   separating the copper sulfide from the iron sulfate; and
   recovering the elemental copper from the copper sulfide.

2. The process of claim 1 wherein the concentration of the copper sulfate solution is from about 30 to about 100 grams per liter of copper.

3. The process of claim 1 wherein the chalcopyrite reaction is conducted from about 180°C to about 200°C.

4. The process of claim 1 wherein the mole ratio of copper sulfate to chalcopyrite reactants is at least about two to one.

5. The process of claim 4 wherein the temperature of the copper sulfate reaction is maintained from about 180°C to about 200°C.

6. A process for hydrometallurgically recovering copper from chalcopyrite comprising:
   initially leaching the chalcopyrite with a copper sulfate solution at a temperature and mole ratio sufficient to form insoluble digenite, minor amounts of other insoluble copper sulfides and a soluble iron sulfate;
   separating the insoluble copper sulfides from the soluble iron sulfate;
   secondarily leaching the copper sulfides with oxygen in an acid medium and in the presence of a jarosite forming cation to form a soluble copper sulfate solution and an insoluble jarosite; and
   recovering a portion of the copper from the copper sulfate solution and recycling the remainder of the copper sulfate solution to the initial leach reaction.

7. The process of claim 6 wherein the mole ratio of copper sulfate to chalcopyrite reactants is at least about two to one.

8. The process of claim 6 wherein the temperature of the copper sulfate reaction is maintained from about 180°C to 200°C.

9. A process for hydrometallurgically recovering copper from chalcopyrite comprising:
   leaching and converting the chalcopyrite with a copper sulfate solution at a temperature and mole ratio sufficient to concurrently form a mixture of an insoluble copper sulfide consisting essentially of digenite, a soluble iron sulfate and sulfuric acid;
   subjecting said concurrently formed mixture to a secondary treatment including leaching with oxygen and addition of a jarosite-forming cation, to produce from said concurrently formed mixture a soluble copper sulfate solution and an insoluble jarosite;
   separating the soluble copper sulfate solution from the insoluble jarosite; and
   recovering elemental copper from the copper sulfate solution.

10. The process of claim 9 wherein a portion of the copper sulfate solution produced from the secondary leaching operation is recycled to treat fresh chalcopyrite feed material.

11. The process of claim 9 wherein the leaching of the chalcopyrite with copper sulfate is performed at a temperature of from about 180°C to about 200°C.

12. The process of claim 9 wherein elemental copper is recovered by means of electrolysis.

13. The process of claim 9 wherein the jarosite-forming cation is sodium.

14. The process of claim 9 wherein the jarosite-forming cation is potassium.

15. The process of claim 9 wherein the jarosite-forming cation is an ammonium ion.

16. The process of claim 9 wherein the chalcopyrite initially treated with the copper sulfate solution is in the presence of other mixed sulfides.

17. The process of claim 9 wherein the mole ratio of copper sulfate to chalcopyrite reactants is at least about two to one.

18. The process of claim 9 wherein the temperature of the copper sulfate reaction is maintained from about 180°C to 200°C.

19. A process for hydrometallurgically recovering elemental copper from chalcopyrite comprising:
   reacting the chalcopyrite with a copper sulfate solution at a temperature and mole ratio sufficient to form an insoluble copper sulfide consisting essentially of digenite, a soluble iron sulfate and sulfuric acid;
   separating the copper sulfide from the iron sulfate;
   leaching the separated copper sulfide with a chloride selected from the group consisting of ferric chloride and cupric chloride in order to produce a solution comprising cuprous chloride, cupric chloride and ferrous chloride; and
   reducing at least a portion of the cuprous chloride to elemental copper.

20. The process of claim 19 wherein the chalcopyrite reaction is conducted from about 180°C to about 200°C.

21. The process of claim 20 wherein the mole ratio of copper sulfate to chalcopyrite reactants is at least about two to one.

22. The process of claim 19 wherein the solution comprising cuprous chloride, cupric chloride and ferrous chloride is subjected to electrolysis to produce elemental copper.

23. A process for hydrometallurgically recovering elemental copper from chalcopyrite comprising:
reacting the chalcopyrite with copper sulfate solution at a temperature and mole ratio sufficient to form an insoluble copper sulfide consisting essentially of digenite, a soluble iron sulfate and sulfuric acid;
separating the copper sulfide form the iron sulfate;
leaching the separated copper sulfide with an ammoniacal leach solution; and
recovering copper from the ammoniacal leached solution.

24. The process of claim 23 wherein the chalcopyrite reaction is conducted from about 180°C to about 200°C.

25. The process of claim 24 wherein the mole ratio of copper sulfate to chalcopyrite reactants is at least about two to one.

* * * * *